United States Patent
Guo et al.

(10) Patent No.: US 12,276,194 B2
(45) Date of Patent: Apr. 15, 2025

(54) AUTOMATIC SUPPORT DEVICE FOR RESISTING ROCK BURST IN MINES

(71) Applicant: SHANDONG UNIVERSITY OF SCIENCE AND TECHNOLOGY, Qingdao (CN)

(72) Inventors: Weiyao Guo, Qingdao (CN); Linpeng Xu, Qingdao (CN); Lexin Chen, Qingdao (CN); Yongqiang Zhao, Qingdao (CN); Bo Li, Qingdao (CN); Chengzhi Xia, Qingdao (CN); Chun Zhu, Qingdao (CN); Gan Li, Qingdao (CN); Lei Zhang, Qingdao (CN)

( * ) Notice: Subject to any disclaimer, the term of this patent is extended or adjusted under 35 U.S.C. 154(b) by 0 days.

(21) Appl. No.: 18/818,611

(22) Filed: Aug. 29, 2024

(65) Prior Publication Data
US 2025/0034996 A1    Jan. 30, 2025

Related U.S. Application Data

(63) Continuation of application No. PCT/CN2023/121352, filed on Sep. 26, 2023.

(30) Foreign Application Priority Data

Jul. 28, 2023  (CN) .......................... 202310938977.7

(51) Int. Cl.
*E21D 23/04* (2006.01)
*E21D 15/44* (2006.01)

(52) U.S. Cl.
CPC .................................. *E21D 15/44* (2013.01)

(58) Field of Classification Search
CPC ....... E21D 15/44; E21D 15/14; E21D 15/465; E21D 15/45; E21D 23/04
See application file for complete search history.

(56) References Cited

U.S. PATENT DOCUMENTS

| 4,143,991 A * | 3/1979 | Stafford | ............. E21D 23/0095 405/291 |
| 4,189,258 A * | 2/1980 | Maykemper | ........ E21D 23/0086 405/291 |
| 10,774,642 B1 * | 9/2020 | Pan | ......................... E21D 15/44 |

* cited by examiner

*Primary Examiner* — Benjamin F Fiorello
(74) *Attorney, Agent, or Firm* — CAIP; Xia Li

(57) ABSTRACT

An automatic support device for resisting rock burst in mines is provided, which includes bases symmetrically distributed, sliding frames are slidably connected to the bases, hydraulic rods are fixedly connected to the bases, and telescopic ends of the hydraulic rods are fixedly connected to the adjacent sliding frames. The sliding frames are fixedly connected to brackets, and the brackets symmetrically distributed are provided with a main support plate, on which pushing rods are provided. The device can slow down the impact force of the device when rock burst occurs in the mine, at the same time, it plays a supporting role in the mine, ensuring the stability of the roof of the mine.

8 Claims, 18 Drawing Sheets

AUTOMATIC SUPPORT DEVICE FOR RESISTING ROCK BURST IN MINES

CROSS-REFERENCE TO RELATED APPLICATIONS

This application is a continuation of International Application No. PCT/CN2023/121352 with a filing date of Sep. 26, 2023, designating the United states, now pending, and further claims to the benefit of priority from Chinese Application No. 202310938977.7 with a filing date of Jul. 28, 2023. The content of the aforementioned applications, including any intervening amendments thereto, are incorporated herein by reference.

TECHNICAL FIELD

The present disclosure relates to the technical field of mine support, in particular to an automatic support device for resisting rock burst in mines.

BACKGROUND

Mine support refers to the engineering technology that takes a series of measures to support the mine walls, roof, and floor during the mining process to ensure the stability and safety of the mine. With the continuous increase of mining depth, the frequency and breaking strength of the rock burst in tunnels are also gradually increasing. The rock burst is a serious dynamic disaster encountered in coal mining. When the rock burst occurs, the far-field surrounding rock of the underground tunnels releases energy, causing instantaneous damage to the support device.

The existing support devices cannot provide support for the side walls of the mine, and cannot guarantee complete support for the mine tunnels. At the same time, it is difficult to buffer rock burst when dealing with rock burst, and when the impact force is large, the hydraulic support in the support device will deform, causing damage to the support device, so that it cannot guarantee the support for mine tunnels.

SUMMARY

In order to overcome the disadvantages described in the background, the present disclosure provides an automatic support device for resisting rock burst in mines.

The technical solution adopted by the present disclosure is as follows:

An automatic support device for resisting rock burst in mines, including bases symmetrically distributed, sliding frames are slidably connected to the bases, hydraulic rods are fixedly connected to the bases, telescopic ends of the hydraulic rods are fixedly connected to the adjacent sliding frames, brackets are fixedly connected to the sliding frames, the brackets distributed symmetrically are provided with a main support plate, the main support plate is provided with first pushing rods evenly spaced and symmetrically distributed and third pushing rods evenly spaced and symmetrically distributed, the main support plate is fixedly connected to second pushing rods symmetrically distributed and fourth pushing rods symmetrically distributed, the first pushing rods with evenly spaced are communicated with the first oil pipe communicated with the adjacent second pushing rods, the third pushing rods with evenly spaced are communicated with the second oil pipe communicated with the adjacent fourth pushing rods, the telescopic ends of the first pushing rods symmetrically distributed and the telescopic ends of the third pushing rods symmetrically distributed are both fixedly connected to upper retaining plates, the main support plate is provided with a pressure regulating assembly for adjusting the positions of the first pushing rods and the third pushing rods, the upper retaining plates with equidistant distribution are fixedly connected to the top plate, the second pushing rods and the fourth pushing rods are respectively slidably connected to the piston plates, springs are fixedly connected between the second pushing rods and adjacent piston plates, and between the fourth pushing rods and adjacent piston plates, the first pushing rods, the second pushing rods, the third pushing rods, and the fourth pushing rods all contain hydraulic fluid.

The advantageous technical effects of the present disclosure are shown as below:

The present disclosure reduces the impact force on the device when the rock burst occurs in the mine by compressing the springs between the piston plate and the fourth pushing rods, while it also provides support for the mine, ensuring the stability of the roof of the mine. By moving the positions of the first pushing rods and the third pushing rods, the support force of the roof on the collapsed part of the mine is increased, thereby reducing the impact force on the device when the rock burst occurs in the mine, and avoiding damage to the device when dealing with rock burst in the mine. By increasing the support area for the roof of the mine through the side retaining plate, and buffering the impact force caused by the collapse of the mine through the fifth pushing rods, the stability of the mine sidewall is ensured. By using the first spring blocks to limit the positions of the sliding seat and the ratchet bar to limit the positions of the pawl, the movement of the side support plates and the sliding frames caused by the collapse of the mine is prevented, ensuring the support for the mine. At the same time, the stability of the mine is improved by supporting both sides of the mine through the sliding frames and side support plates. By using the third blocks to limit the positions of the lower support rods, it can avoid the situation that the device to lose its support for the mine when the falling stones squeezes and damages the device in the event of a mine collapse. At the same time, the upper support rods and lower support rods symmetrically distributed disperse the squeezing force of the falling stones to both sides, improving the stability of the device. By using the second spring blocks to limit the positions of the contact frames, the contact frames cannot be reset after moving downwards, avoiding the loss of support for the mine caused by the collapse of the mine bottom, further reducing the impact force on the mine caused by collapse.

REFERENCE NUMBERS IN THE DRAWINGS

Figure 1:
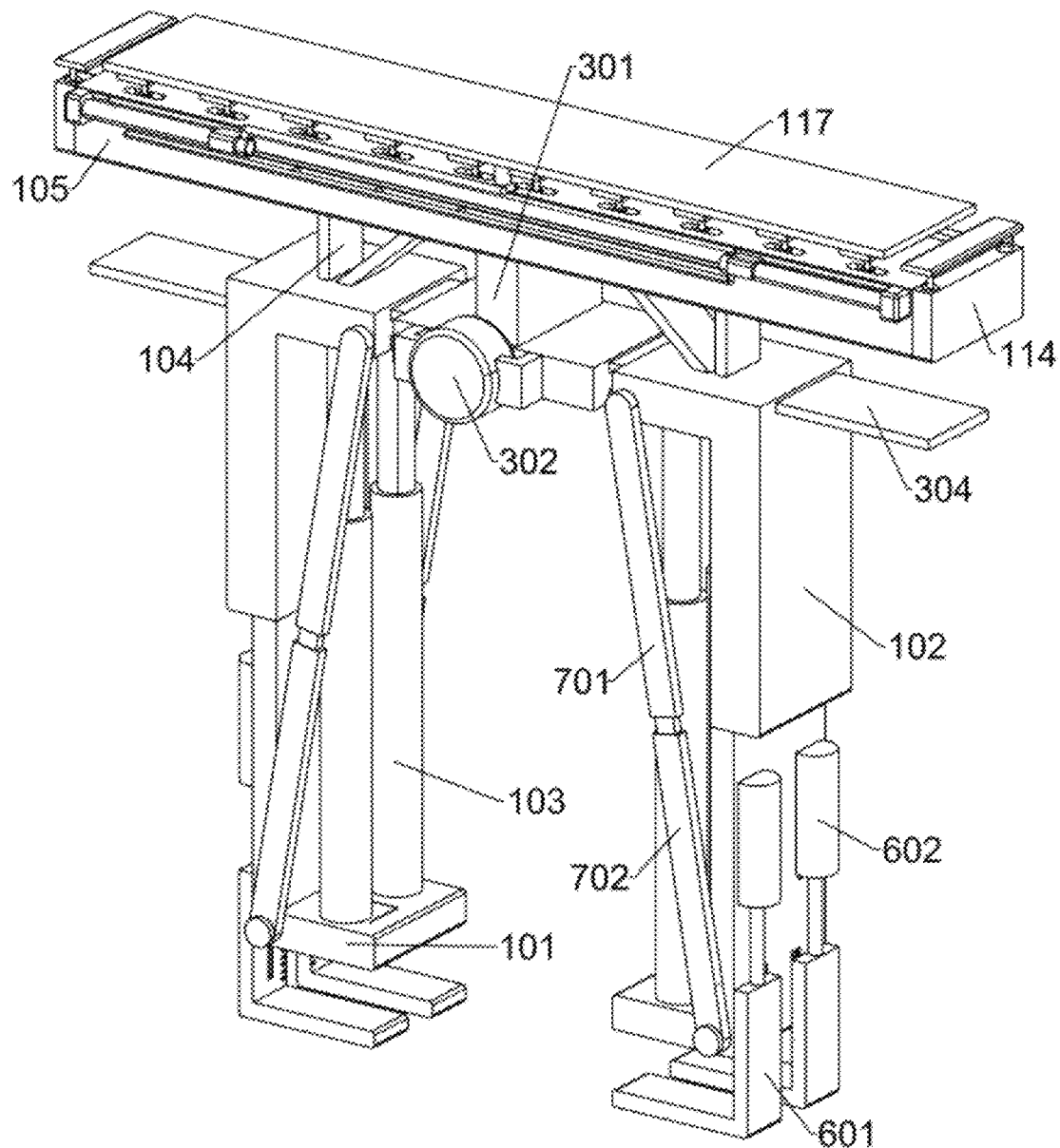
FIG. 1 is a schematic diagram of the three-dimensional structure of the present disclosure.
Figure 2:
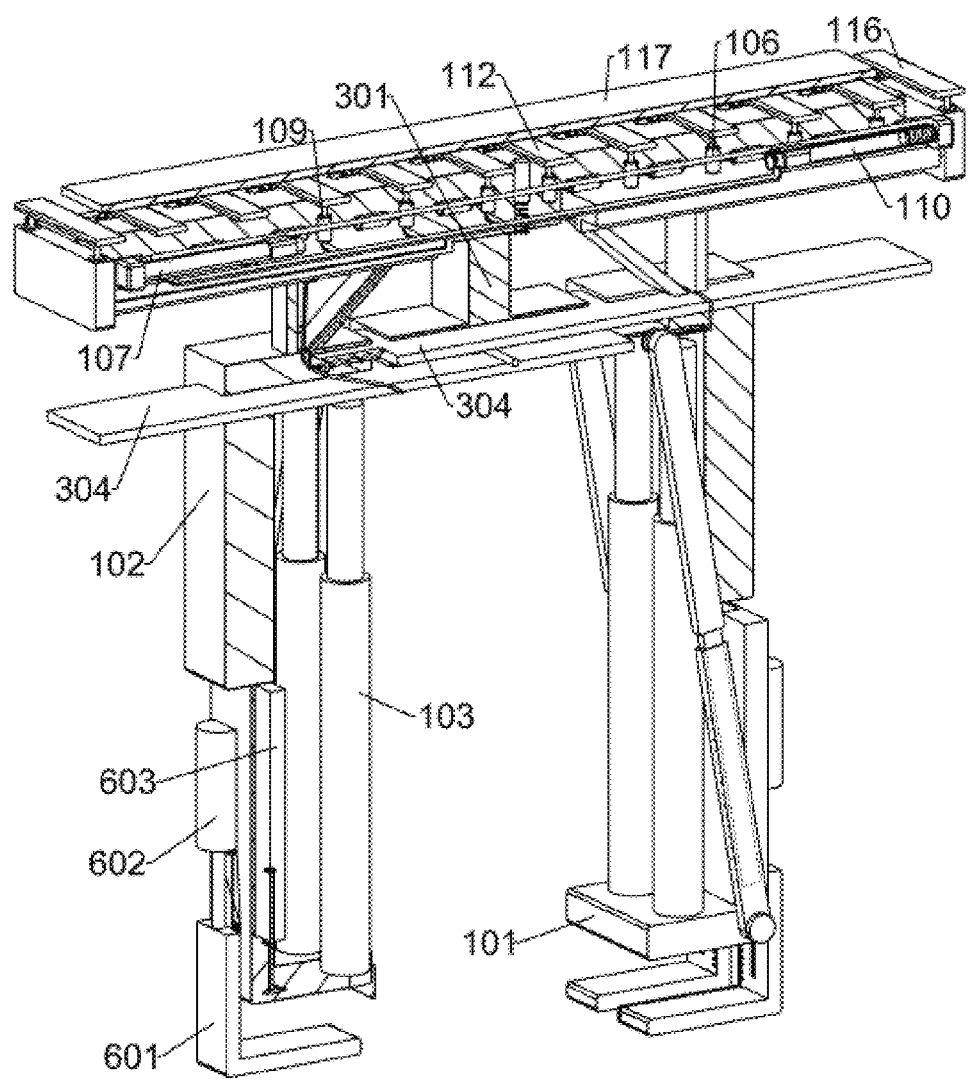
FIG. 2 is a sectional view of the three-dimensional structure of the sliding frames, the main support plate and the fixed seat of the present disclosure.
Figure 3:
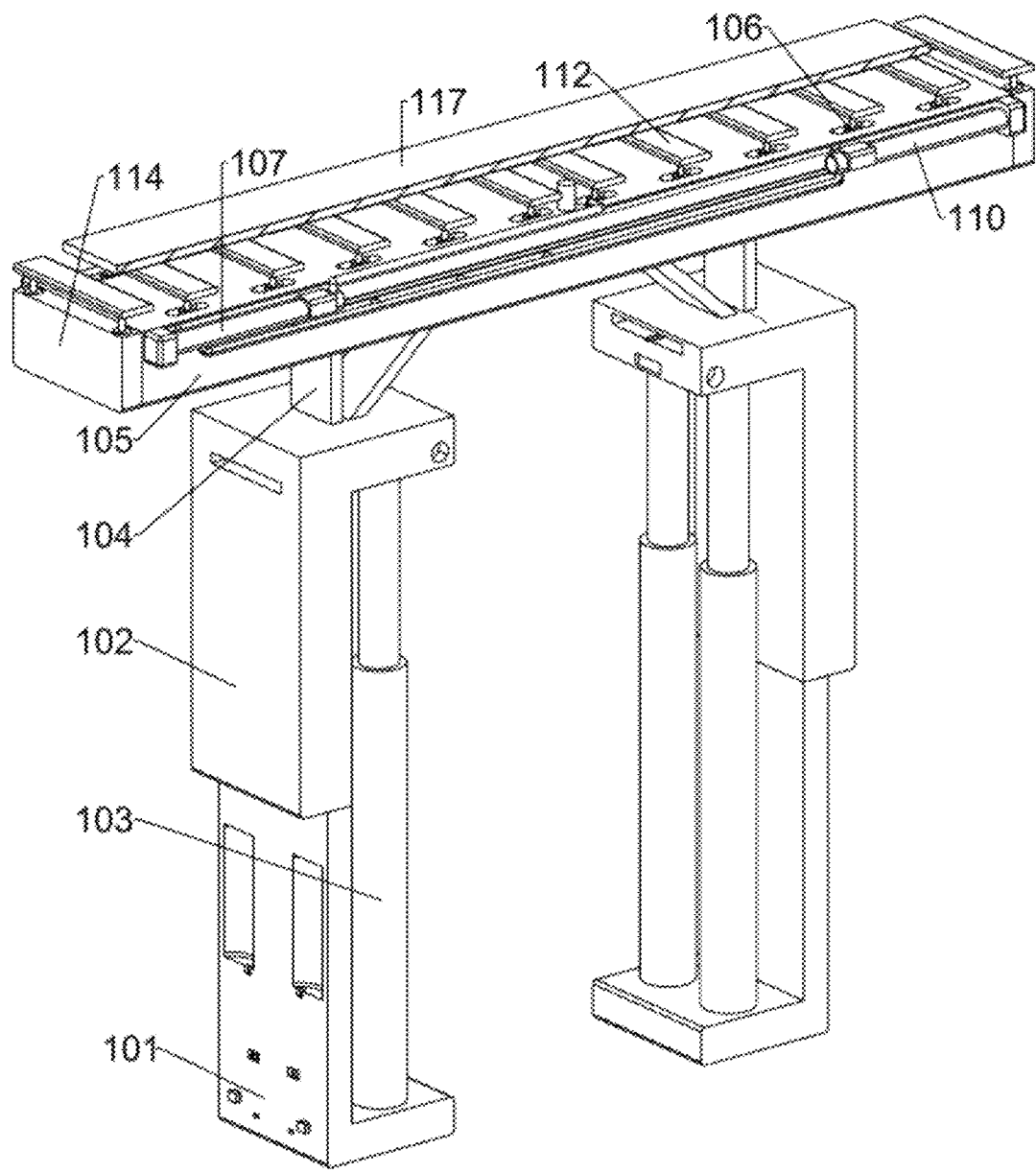
FIG. 3 is a schematic diagram of the three-dimensional structure of the bracket, the main support plate and other components of the present disclosure.
Figure 4:
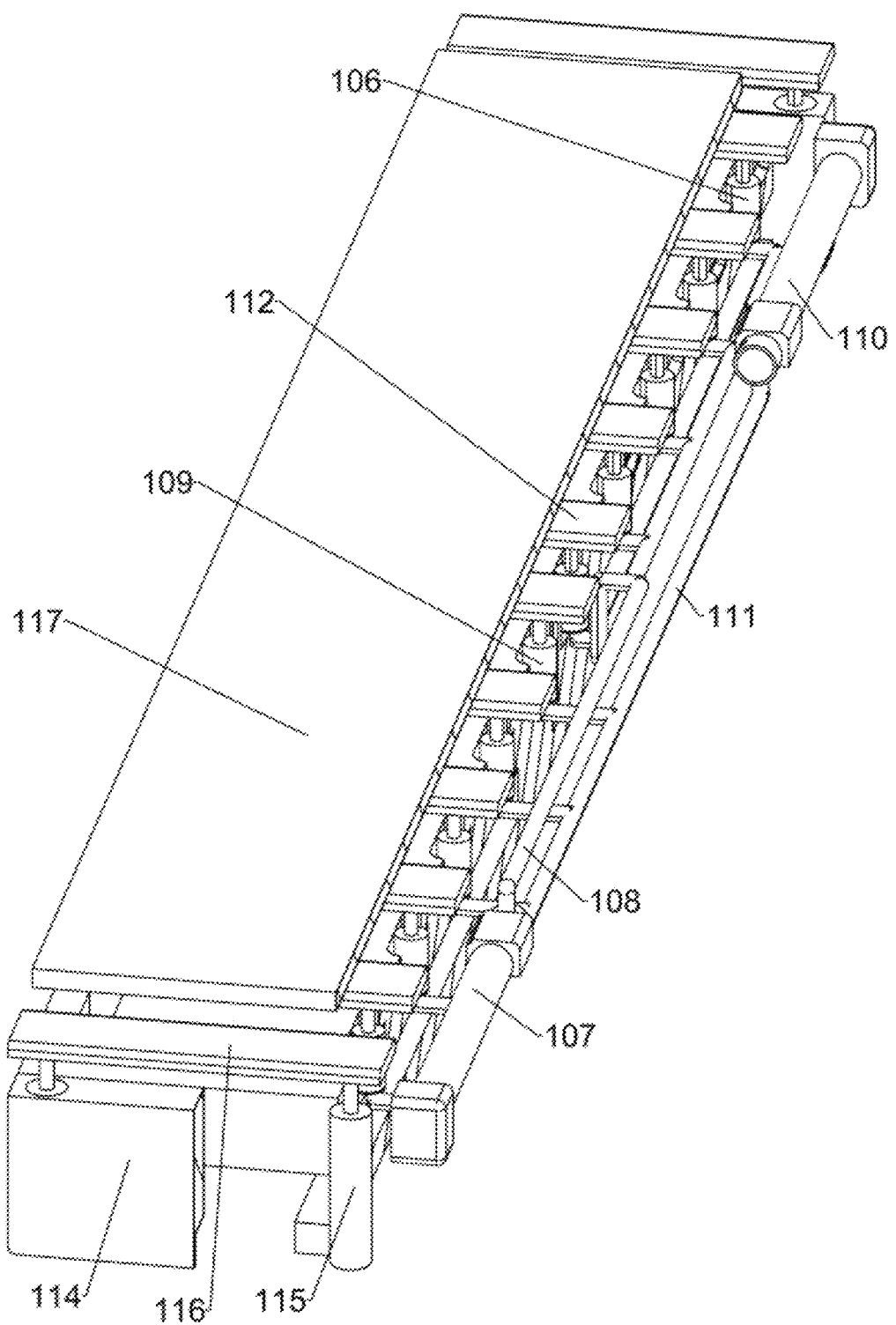
FIG. 4 is a schematic diagram of the three-dimensional structure of the top plate supporting the roof of the mine of the present disclosure.
Figure 5:
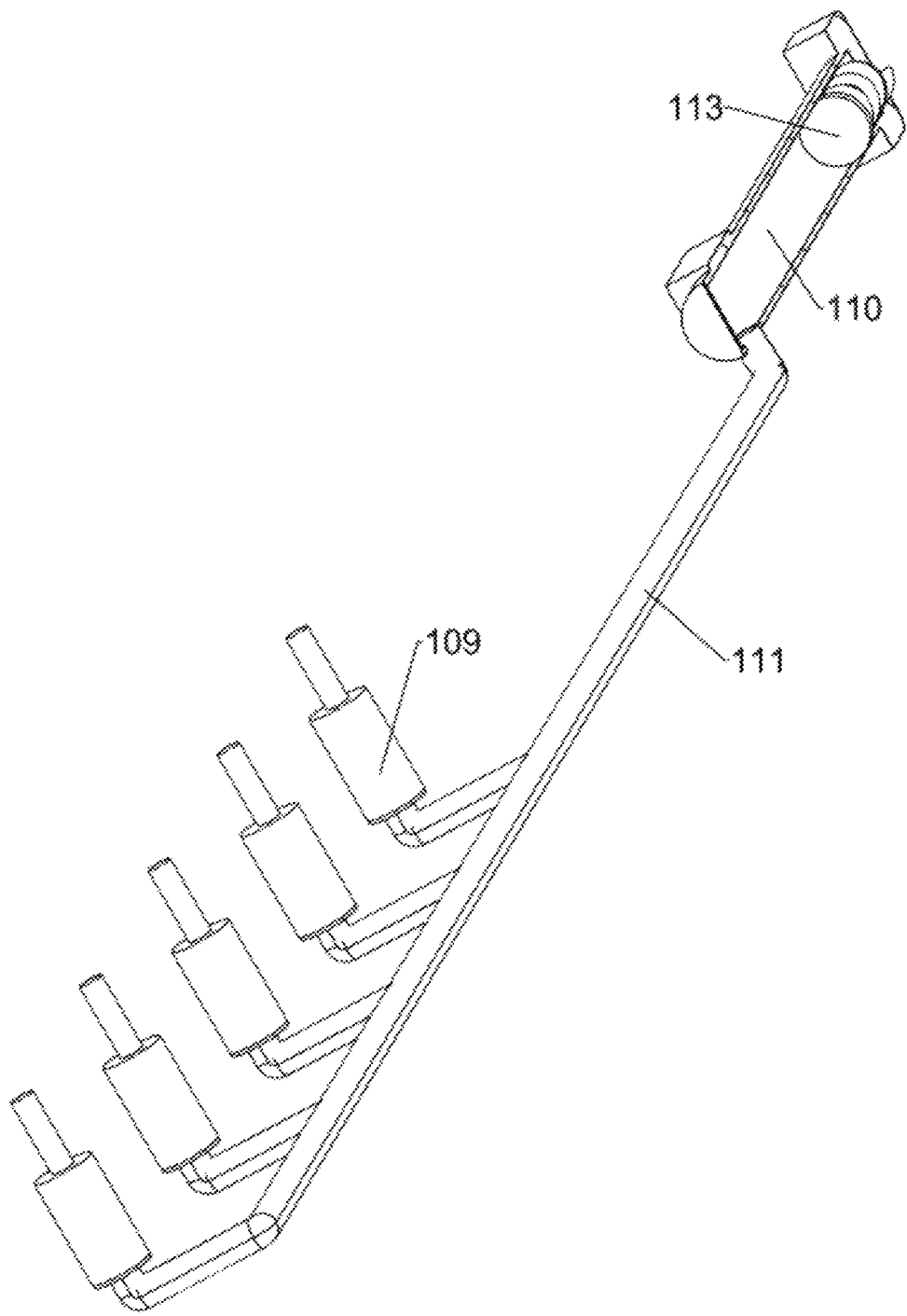
FIG. 5 is a schematic diagram of the three-dimensional structure of the third pushing rod, the second oil pipe and other components of the present disclosure.

101—base, 102—sliding frame, 103—hydraulic rod, 104—bracket, 105—main support plate, 106—first pushing rod, 107—second pushing rod, 108—first oil pipe, 109—third pushing rod, 110—fourth pushing rod, 111—second oil pipe, 112—upper retaining plate, 113—piston plate, 114—side support plate, 115—fifth pushing rod, 116—side retaining plate, 117—top plate, 201—sixth pushing rod, 202—first chamber, 203—second chamber, 204—third oil pipe, 205—fourth oil pipe, 301—fixed seat, 302—servo motor, 303—spur gear, 304—sliding plate, 305—upper friction plate, 306—first pulling rope, 401—sliding seat, 402—ratchet bar, 403—pawl, 404—second pulling rope, 405—lower friction plate, 406—first spring block, 407—third pulling rope, 408—first limiting groove, 601—contact frame, 602—retractable rod, 603—locking plate, 604—irregular frame, 605—second spring block, 701—upper support rod, 702—lower support rod, 703—third spring block, 704—fourth pulling rope, 705—second limiting groove.

DETAILED DESCRIPTION OF THE EMBODIMENTS

In order to make the technical problems, technical solutions and beneficial effects of the present invention clearer, the present invention will be further described in detail below with reference to the accompanying drawings and embodiments.

Embodiment 1

An automatic support device for resisting rock burst in mines, as shown in FIGS. 1-5, includes two symmetrically distributed bases 101, and the bases 101 are L-shaped plates. The upper parts of the two symmetrically distributed bases 101 are slidably connected to sliding frames 102, which are L-shaped plates. Two symmetrically distributed hydraulic rods 103 are fixedly connected between the sliding frames 102 and the bases 101. Two brackets 104 are fixedly connected to the upper parts of the sliding frames 102, and the brackets 104 are triangular in shape. The upper sides of the two brackets 104 are provided with a main support plate 105, and the right half of the main support plate 105 is provided with ten of the first pushing rods 106 that are evenly spaced and symmetrically distributed. The left parts of the front and rear sides of the main support plate 105 are fixedly connected to the second pushing rods 107. Five of the first pushing rods 106 on the same side are communicated with a first oil pipe 108 communicated with the second pushing rods 107. The left half of the main support plate 105 is provided with ten of the third pushing rods 109 that are evenly spaced and symmetrically distributed. The right parts of the front and rear sides of the main support plate 105 are fixedly connected to the fourth pushing rods 110. The five third pushing rods 109 on the same side are communicated with a second oil pipe 111. The fourth pushing rods 110 are communicated with to the adjacent second oil pipe 111. The telescopic ends of the two first pushing rods 106 symmetrically distributed along the front-rear direction are fixedly connected to a upper retaining plate 112, and the two third pushing rods 109 symmetrically distributed along the front-rear direction are fixedly connected to the upper retaining plate 112. The main support plate 105 is provided with a pressure regulating assembly for adjusting the positions of the first pushing rods 106 and the third pushing rods 109. The upper sides of ten upper retaining plates 112 are fixedly connected to a top plate 117. The second pushing rod 107 and the fourth pushing rod 110 are respectively slidably connected with a piston plate 113 inside, and the piston plate 113 in the fourth pushing rod 110 is located on the right side of the adjacent fourth pushing rod 110, the piston plate 113 in the second pushing rod 107 is located on the left side of the adjacent second pushing rod 107. Spring for reducing impact force is fixedly connected between the piston plate 113 and the second pushing rod 107, and also fixedly connected between the piston plate 113 and the fourth pushing rod 110. Side support plates 114 are provided on both sides of the main support plate 105, and two symmetrically distributed fifth pushing rods 115 are fixedly connected inside the side support plate 114. The telescopic ends of the two fifth pushing rods 115 are jointly fixedly connected to a side retaining plate 116. The first pushing rods 106, the second pushing rods 107, the third pushing rods 109, the fourth pushing rods 110, and the fifth pushing rods 115 contain hydraulic oil.

Figure 6:
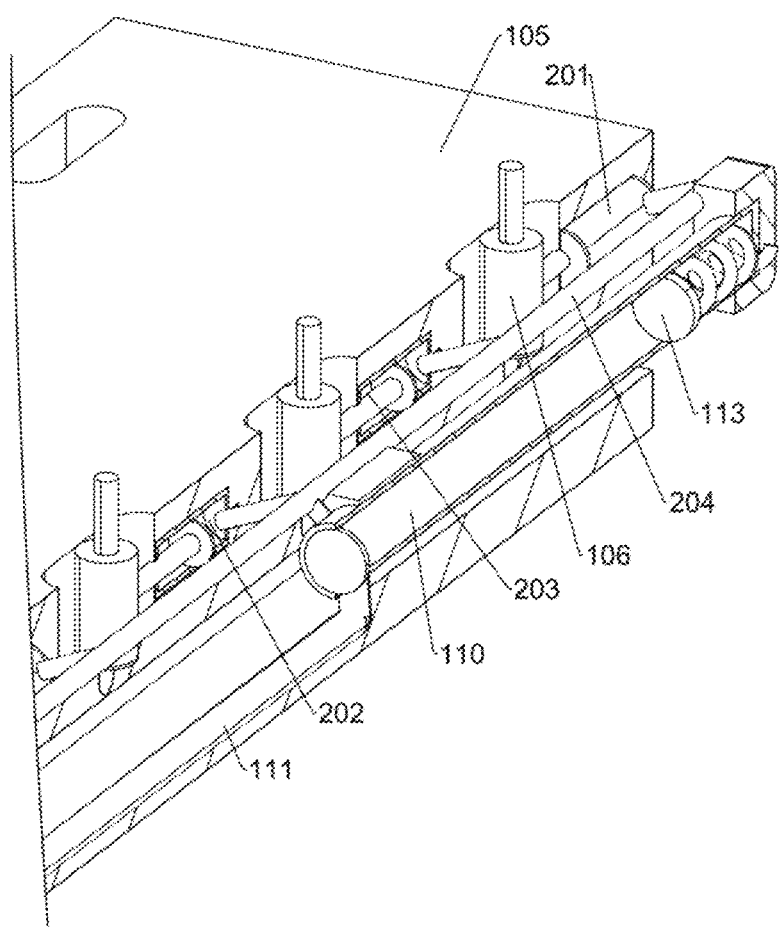
FIG. 6 is a schematic diagram of the three-dimensional structure of the fit between the first chambers and the third oil pipe of the present disclosure.
Figure 7:
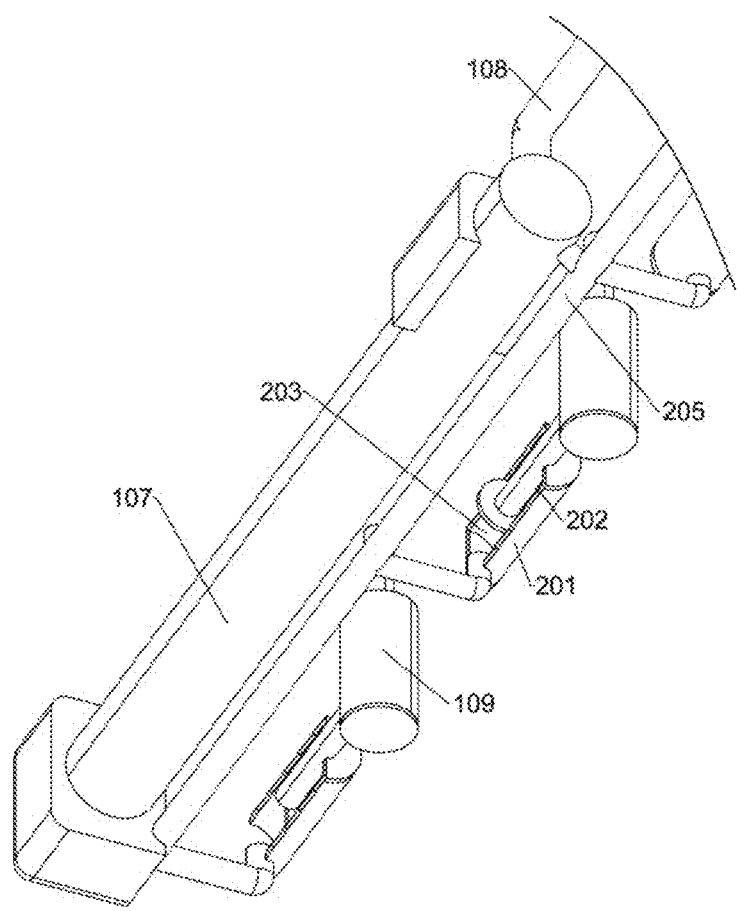
FIG. 7 is a schematic diagram of the three-dimensional structure of the fit between the fourth oil pipe and the second chambers of the present disclosure.
Figure 8:
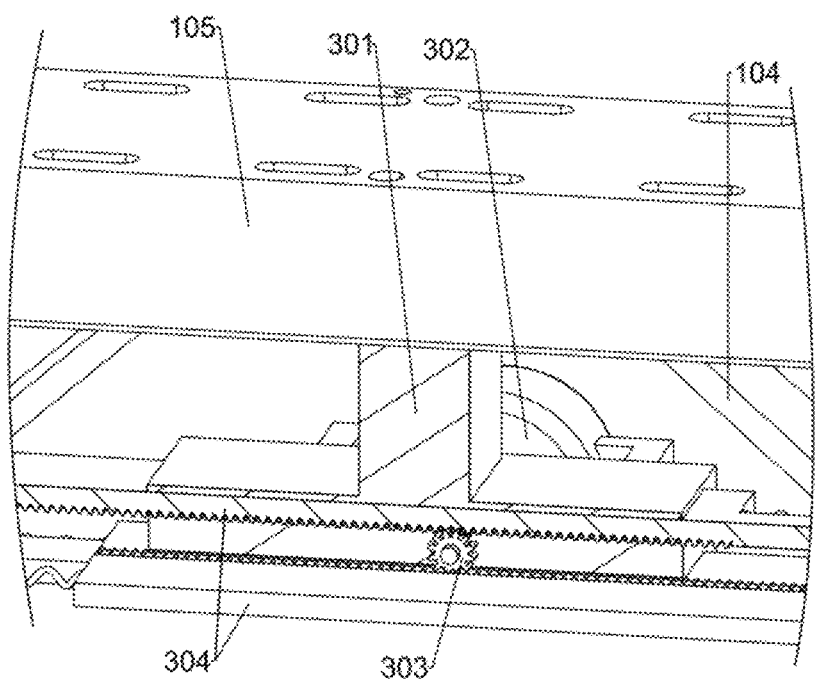
FIG. 8 is a schematic diagram of the three-dimensional structure of the fit between the spur gear and the sliding plate of the present disclosure.

As shown in FIG. 6 and FIG. 7, the pressure regulating assembly includes twenty of the sixth pushing rods 201 that are evenly spaced and symmetrically distributed. The sixth pushing rods 201 are used to adjust the positions of the first pushing rods 106 and the third pushing rods 109. The sixth pushing rod 201 has a piston rod inside and is fixed to the main support plate 105. The sixth pushing rods 201 are in a horizontal state, and the telescopic ends of the sixth pushing rods 201 are fixed to the first pushing rods 106 and the third pushing rods 109. The right part of the piston rod of the sixth pushing rod 201 is provided with a first chamber 202, and the left part of the piston rod of the sixth pushing rod 201 is provided with a second chamber 203. The first chamber 202 is communicated with a third oil pipe 204, and the third oil pipe 204 is communicated with the left side of the fourth pushing rod 110. The second chamber 203 is communicated with a fourth oil pipe 205, and the fourth oil pipe 205 is communicated with the right side of the second pushing rod 107. The first pushing rods 106 and the third pushing rods 109 both slide and cooperate with the main support plate 105.

When the operator use this device, the device is first placed in the appropriate position. Then, the operator activates four hydraulic rods 103, the four hydraulic rods 103 drive two sliding frames 102 to move upwards. The sliding frames 102 drive adjacent brackets 104 to move upwards, and the two brackets 104 drive the main support plate 105 to move upwards. The main support plate 105 drives all the parts on it to move synchronously upwards. When the top plate 117 comes into contact with the roof of the mine, the device plays a supporting role for the mine. At this time, the operator closes the four hydraulic rods 103.

When the left part of the roof of the mine collapses, the falling stones compress the left part of the top plate 117. During this process, the compression force on the left part of the top plate 117 is greater than that on the right part of the top plate 117. The top plate 117 moves downward and compresses the upper retaining plate 112 on the left part. Then, the upper retaining plate 112 presses the adjacent third pushing rod 109. The third pushing rod 109 compresses and squeezes the hydraulic oil inside it into the fourth pushing rod 110 through the second oil pipe 111. Then, the hydraulic oil enters the fourth pushing rod 110 through the second oil pipe 111 to push the piston plate 113 and compresses the spring between the piston plate 113 and the fourth pushing rod 110. By compressing the spring between the piston plate 113 and the fourth pushing rod 110, the impact force on the device during the occurrence of rock burst in the mine is reduced, it also provides support for the mine, ensuring the stability of the mine roof.

As the hydraulic oil inside the fourth pushing rod 110 are gradually increased, the piston plate 113 moves to the right of the fourth pushing rod 110. The fourth pushing rod 110 squeezes the hydraulic oil into the first chamber 202 through the third oil pipe 204, and then the hydraulic oil inside the first chamber 202 gradually are increased, the hydraulic oil inside the first chamber 202 drives the telescopic end of the sixth pushing rod 201 to move to the left, and the telescopic end of the sixth pushing rod 201 drives the first pushing rod 106 and the third pushing rod 109 to move to the left, the upper retaining plate 112 moves synchronously to the left, so as to increase the support force on the left side of the top plate 117.

The right part of the top plate 117 moves downwards when the right side of the roof of the mine collapses, the top plate 117 presses the first pushing rods 106. The hydraulic oil in the first pushing rods 106 enters the second pushing rod 107 through the first oil pipe 108, and the hydraulic oil in the second pushing rod 107 presses the piston plate 113 inside. The piston plate 113 moves outward and presses the spring between the piston plate 113 and the second pushing rod 107. When the piston plate 113 moves to the left side of the second pushing rod 107, the hydraulic oil inside the second pushing rod 107 enters the second chamber 203 through the fourth oil pipe 205, the hydraulic oil in the second chamber 203 presses the telescopic end of the sixth pushing rod 201, and the telescopic end of the sixth pushing rod 201 pushes the first pushing rod 106 and the third pushing rod 109 to move to the right, increasing the support force on the right side of the top plate 117. By moving the positions of the first pushing rod 106 and the third pushing rod 109, the support force of the top plate 117 on the collapsed part of the mine is increased, thereby reducing the impact force on the device when the rock burst of the mine happens, and avoiding damage to the device when dealing with the rock burst of the mine.

During the upward movement of the main support plate 105, the main support plate 105 drives the two side support plates 114 to move synchronously upward. When the top plate 117 contacts the roof of the mine, the side retaining plate 116 contacts the roof of the mine. By increasing the support area for the roof of the mine through the side support plate 116, and buffering the impact force caused by the collapse of the mine through the fifth pushing rod 115, the stability of the mine sidewall is ensured.

After the use of this device, the operator activates four hydraulic rods 103, then the four hydraulic rods 103 return to their original positions and drive the sliding frame 102, the bracket 104, the main support plate 105, and all parts on them to move downward synchronously. After the top plate 117 lost contact with the roof of the mine, the device lost its supporting function on the roof of the mine, and then the operator closes the four hydraulic rods 103 and ends the use of the device.

Embodiment 2

On the basis of the Embodiment 1, as shown in FIGS. 1, 8-10, and 18, a sliding mechanism is further included, which is set on the main support plate 105. The sliding mechanism is used to separate the bases 101 and the sliding frames 102 to both sides. The sliding mechanism includes a fixed seat 301, and the fixed seat 301 is T-shaped and fixed to the lower side of the middle of the main support plate 105. A servo motor 302 is installed on the front side of the fixed seat 301. The output shaft of the servo motor 302 is fixedly connected to a spur gear 303, and the fixed seat 301 is slidably connected to two symmetrically distributed sliding plates 304. The sliding plate 304 is divided into a rectangular plate part and a T-shaped plate part. The two sliding plates 304 are symmetrical with respect to the center of the output shaft of the servo motor 302. The opposite surfaces of the rectangular plate parts of the two sliding plates 304 are provided with gear racks that mesh with the spur gear 303, the T-shaped plate parts of two symmetrically distributed sliding plates 304 are respectively matched with adjacent sliding frames 102. A spring is fixedly connected between the T-shaped plate parts of two symmetrically distributed sliding plates 304 and adjacent sliding frames 102. The front side of two symmetrically distributed brackets 104 is slidably connected to an upper friction plate 305, and the lower side of the upper friction plate 305 is made of rubber material. A first pulling rope 306 is fixedly connected between the lower side of the upper friction plate 305 and the adjacent sliding plates 304. When the sliding plates 304 are in limit fit with the adjacent sliding frames 102, the first pulling rope 306 is in a tension state, and the upper side of the upper friction plate 305 is fixedly connected to the adjacent brackets 104 with a tension spring. The upper sides of the two symmetrically distributed brackets 104 are both slidably connected to the sliding seats 401, the sliding seat 401 is fixedly connected to the adjacent side support plate 114, the sliding seat 401 is provided with a first locking assembly for fixing the brackets 104 and a second locking assembly for fixing itself.

Figure 10:
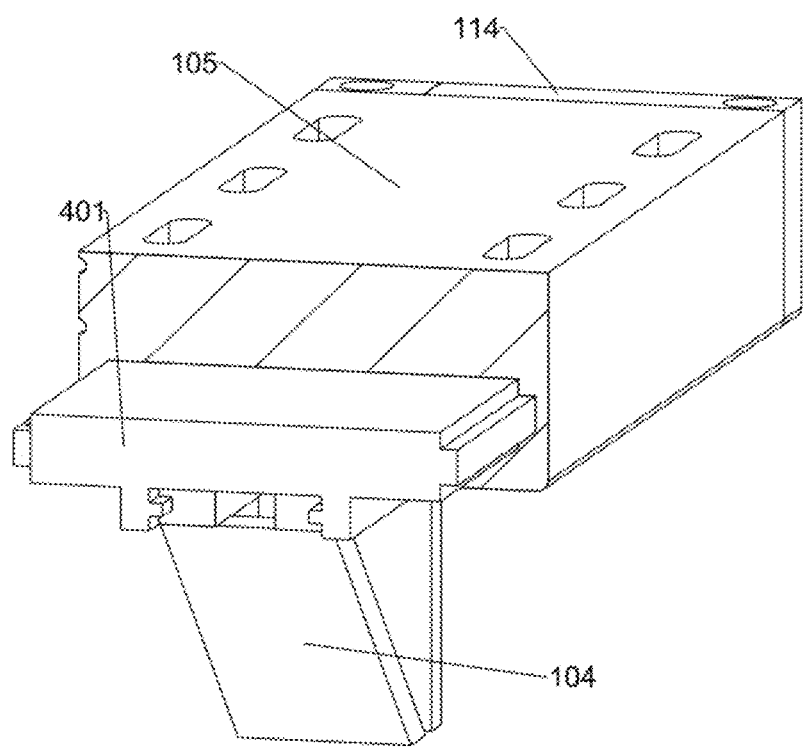
FIG. 10 is a schematic diagram of the three-dimensional structure of the fit between the bracket and the main support plate of the present disclosure.
Figure 11:
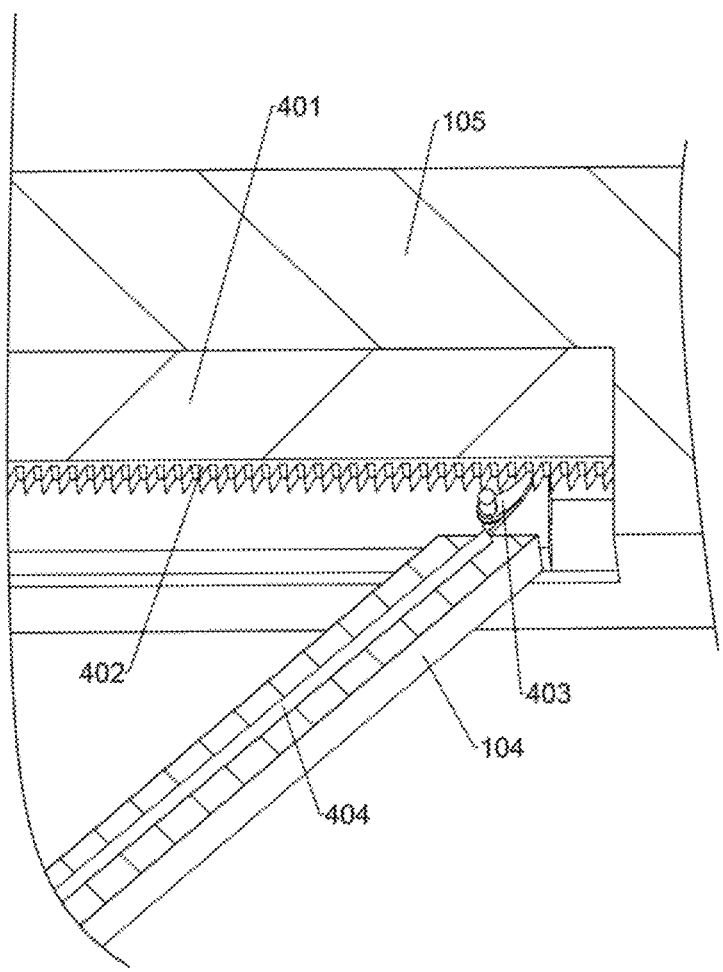
FIG. 11 is a schematic diagram of the three-dimensional structure of the limit fit between the ratchet bar and the pawl of the present disclosure.
Figure 18:
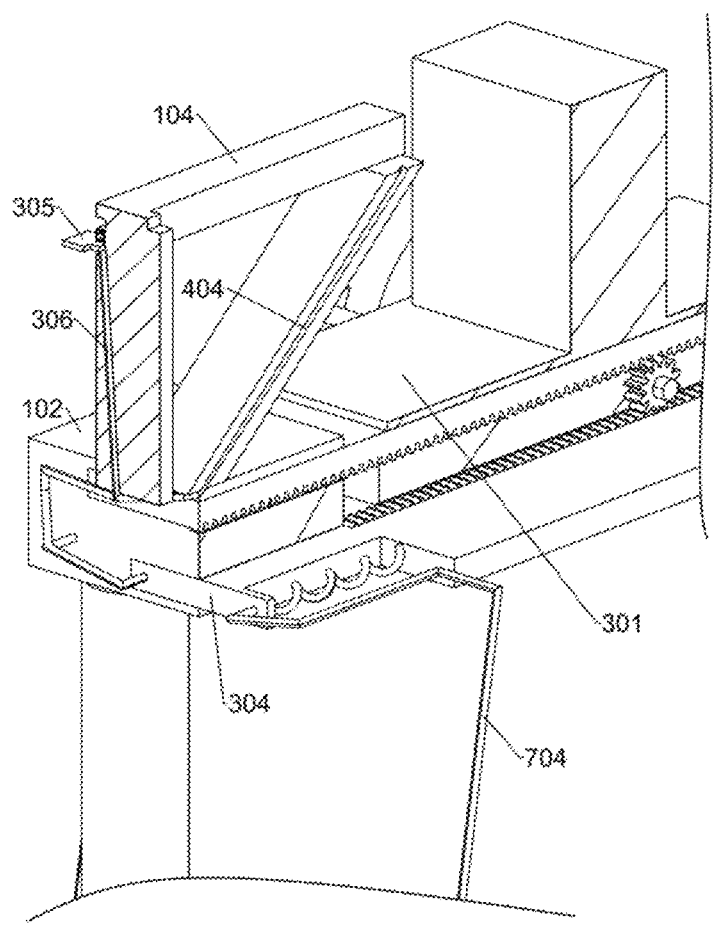
FIG. 18 is a schematic diagram of the three-dimensional structure of the sliding plate, the first pulling rope, the third pulling rope and other components of the present disclosure.

As shown in FIGS. 10, 11, and 18, the first locking assembly includes two symmetrically distributed ratchet bars 402. The ratchet bars are respectively fixed to the lower side of adjacent sliding seats 401. The upper parts of the two brackets 104 are rotatably connected with corresponding pawls 403 matched with the ratchet bars 402. A torsion spring is fixed between the pawl 403 and the adjacent bracket 104. The lower side of the pawl 403 is fixed with a second pulling rope 404, and the second pulling rope 404 is fixed to the adjacent sliding plate 304. The second pulling rope 404 is in a tension state.

Figure 9:
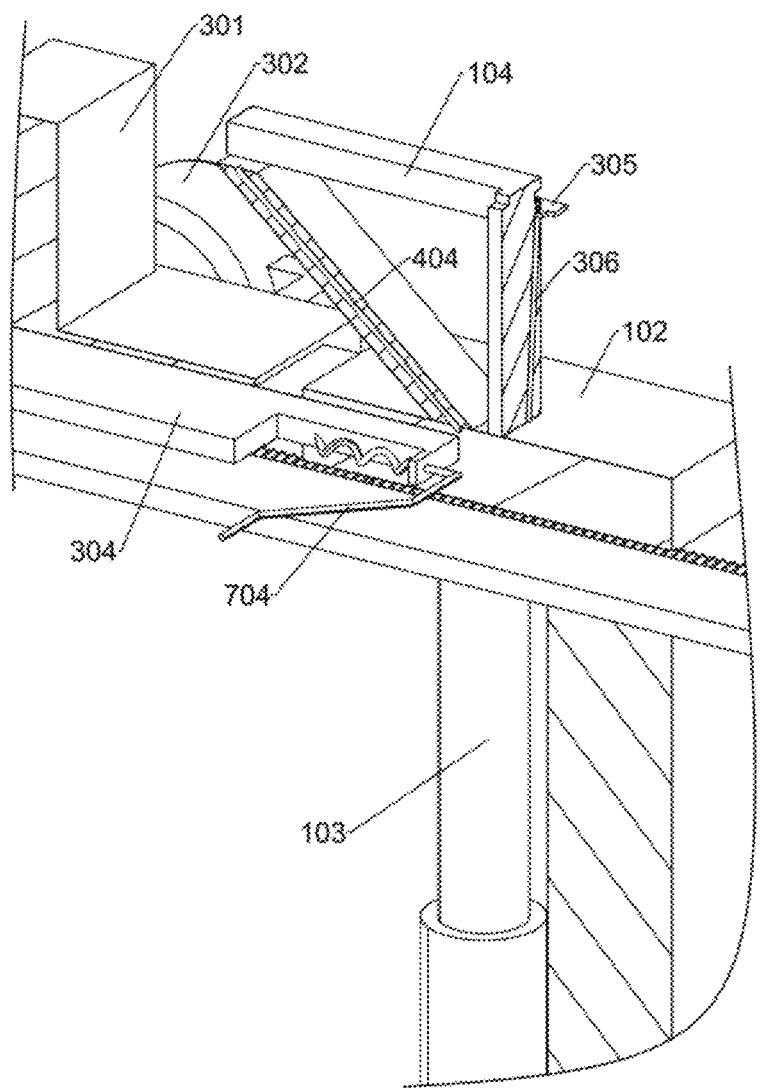
FIG. 9 is a schematic diagram of the three-dimensional structure of the fit between the sliding plate and the sliding frame of the present disclosure.
Figure 12:
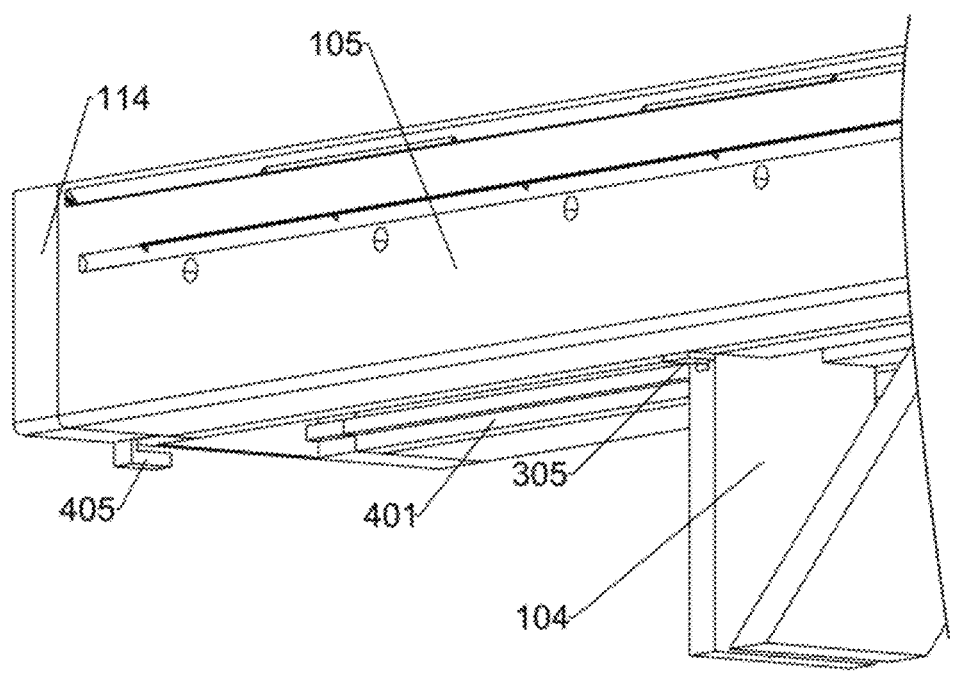
FIG. 12 is a schematic diagram of the three-dimensional structure of the fit between the upper friction and the lower friction plate of the present disclosure.

As shown in FIG. 9 and FIG. 12, the lower friction plate 405 is slidably connected to the lower side of the side support plate 114. The lower friction plate 405 is an L-shaped plate, and its surface is made of rubber material. The lower friction plate 405 is in contact with the adjacent upper friction plate 305. The sliding seats 401 are in a sliding fit with the main support plate 105, and the brackets 104 are in limit fit with the adjacent side support plates 114. When the symmetrically distributed sliding plates 304 move toward the middle, the sliding plates 304 pull the first pulling rope 306, and the first pulling rope 306 pulls the upper friction plate 305. The upper friction plate 305 moves downward and closely attaches to the lower friction plate 405. The frictional force between the upper friction plate 305 and the lower friction plate 405 is greater than the frictional force between the sliding seat 401 and the bracket 104.

Figure 13:
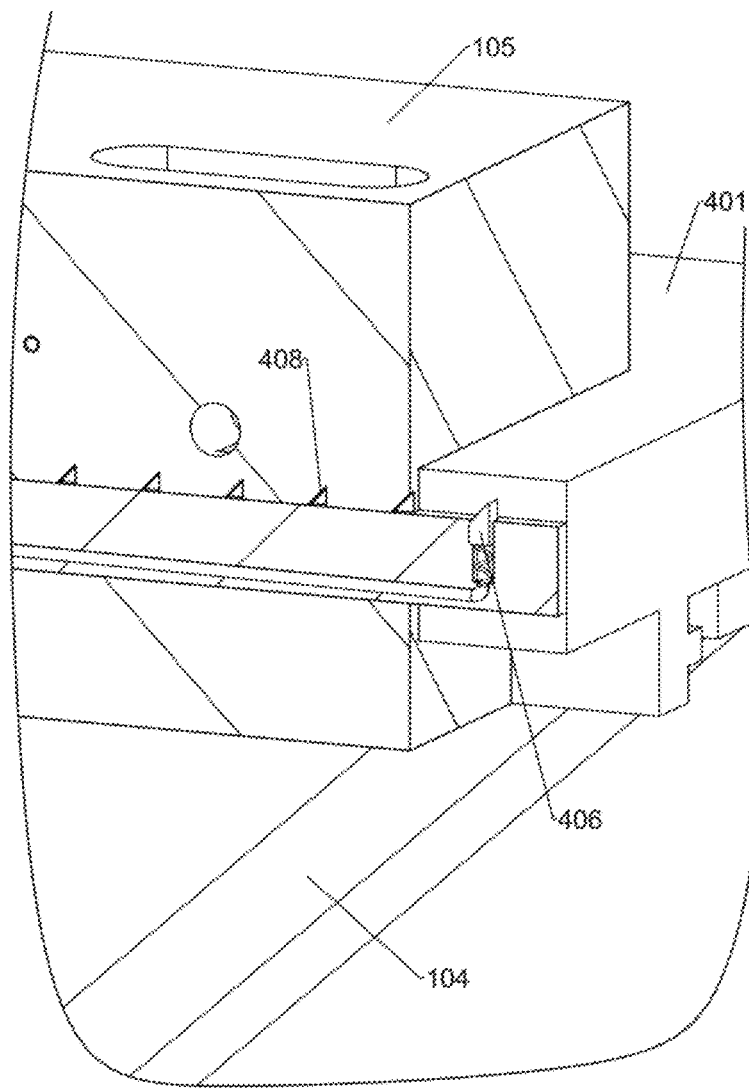
FIG. 13 is a schematic diagram of the three-dimensional structure of the limit fit between the first spring block and the main support plate of the present disclosure.
Figure 14:
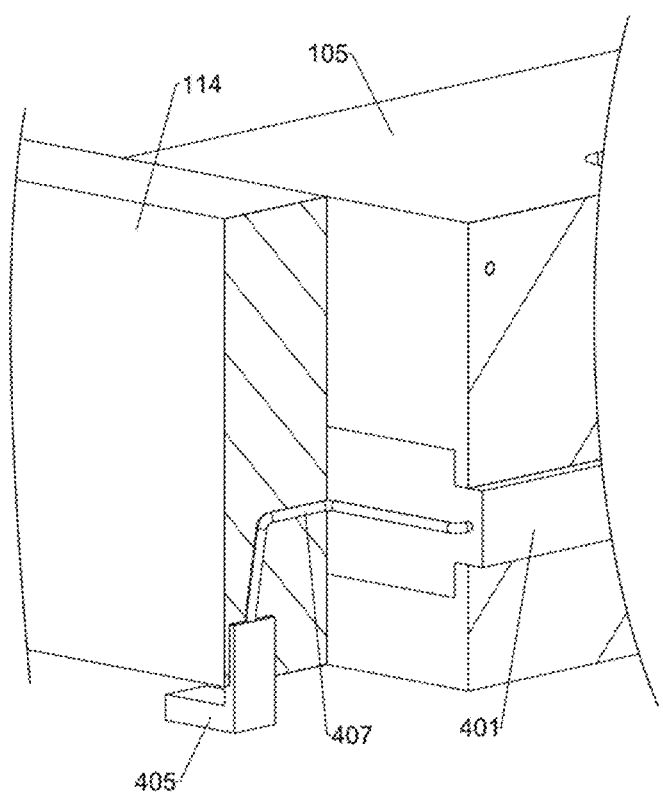
FIG. 14 is a schematic diagram of the three-dimensional structure of the lower friction plate, the third pulling rope and other components of the present disclosure.

As shown in FIG. 13 and FIG. 14, the second locking assembly includes two symmetrically distributed first spring blocks 406, and the symmetrically distributed first spring blocks 406 are set on the sliding seats 401. The upper side of the first spring blocks 406 are inclined, the main support plate 105 are provided with the first limiting grooves 408 that match the inclined surfaces of the first spring blocks 406. A third pulling rope 407 is fixedly connected between the first spring block 406 and the adjacent lower friction plate 405, and the third pulling rope 407 is in a tension state. The first spring block 406 is in limit fit with the first limiting grooves 408 of the main support plate 105.

After the top plate 117 comes into contact with the roof of the mine, the operator turns on the servo motor 302. The output shaft of the servo motor 302 drives the spur gear 303 to rotate. The spur gear 303 drives two sliding plates 304 to move to both sides through the rack, and the two sliding plates 304 respectively drive the adjacent sliding frames 102 to move backward. At the same time, the two sliding frames 102 drive all the parts on them to move synchronously. During the process of moving the two brackets 104 to the left and right sides, when the bracket 104 contacts the adjacent side support plate 114, the upper friction plate 305 is located above the adjacent lower friction plate 405. At the same time, the bracket 104 drives the side support plate 114 and all the parts on it to move, and the side support plate 114 drives the adjacent sliding seat 401 and all the parts on it to move synchronously. During the movement of the two brackets 104 to both sides, the ratchet bars 402 compress the adjacent pawls 403 to cause the pawls 403 to swing. During the sliding process of the two side support plates 114 to the left and right sides, the main support plate 105 compresses the two first spring blocks 406.

When the side support plates 114 come into contact with both sides of the mine, the operator turns off the servo motor 302. At this time, the first spring block 406 enters into the first limiting grooves 408 corresponding to the main support plate 105, and the pawl 403 is clamped by the ratchet bar 402. The first spring block 406 limits the sliding seat 401 and the ratchet bar 402 limits the pawl 403, so as to prevent the movement of the side support plate 114 and the sliding frame 102 due to the collapse of the mine, ensuring the support for the mine. At the same time, the sliding frame 102 and the side support plate 114 support both sides of the mine, improving the stability of the mine.

After the use of this device, the operator turns on the servo motor 302, and the output shaft of the servo motor 302 drives the spur gear 303 to rotate in the reverse direction. Through the racks on the sliding plates 304, the spur gear 303 respectively drives the upper and lower sliding plates 304 respectively to move toward the middle and reset. The sliding plates 304 drive the brackets 104 to move towards the middle. During the movement of the sliding plates 304 to the middle, the sliding plates 304 pull the first pulling rope 306, and then the first pulling rope 306 moves and pulls the corresponding upper friction plate 305. The upper friction plate 305 moves downward and presses the adjacent lower friction plate 405, causing the lower friction plate 405 to move downward. During the downward movement of the lower friction plate 405, the lower friction plate 405 pulls the third pulling rope 407, and the third pulling rope 407 pulls the first spring blocks 406 moves downwards, causing the first spring blocks 406 to lose its limit on the main support plate 105. Subsequently, during the process of the brackets 104 moving toward the middle, due to the frictional force between the upper friction plate 305 and the lower friction plate 405, the brackets 104 drive the corresponding sliding seats 401 to move inward.

During the movement of the sliding plate 304 toward the middle, the sliding plate 304 pulls the second pulling rope 404, and the second pulling rope 404 pulls the pawl 403 to make it lose contact with the ratchet bar 402. As a result, when the bracket 104 drives the sliding seat 401 to move inward to its original position, the bracket 104 moves inward and returns to its original position. The sliding frame 102 and all parts on it, as well as the main support plate 105 and all parts on it, move synchronously towards the middle. When the sliding frame 102 returns to its original position, the operator turns off the servo motor 302 and ends the use of this device.

Embodiment 3

Figure 15:
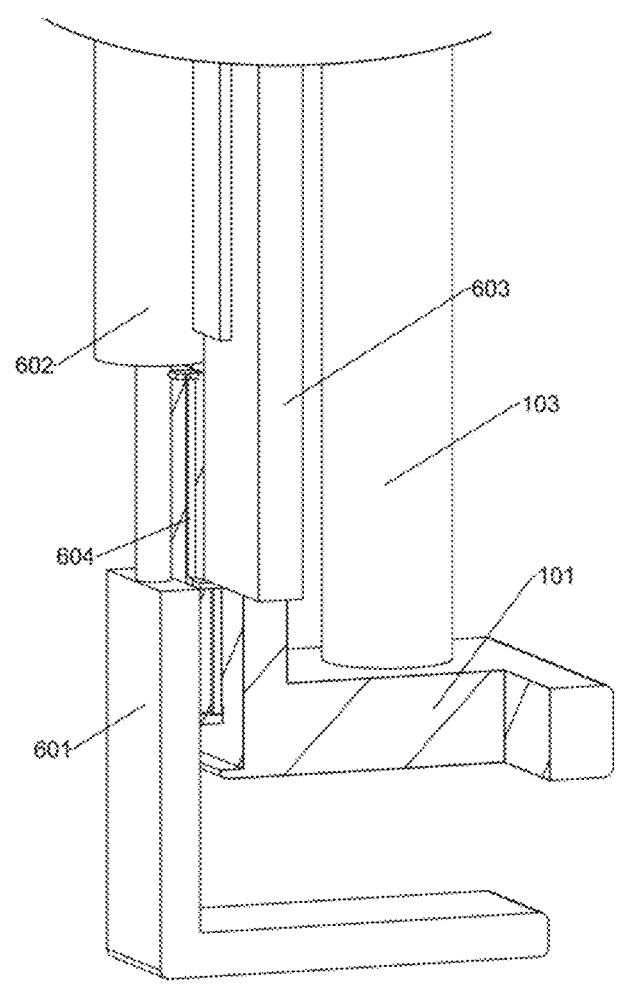
FIG. 15 is a schematic diagram of the three-dimensional structure of the contact frame, the retractable rod, the locking plate and other components of the present disclosure.
Figure 16:
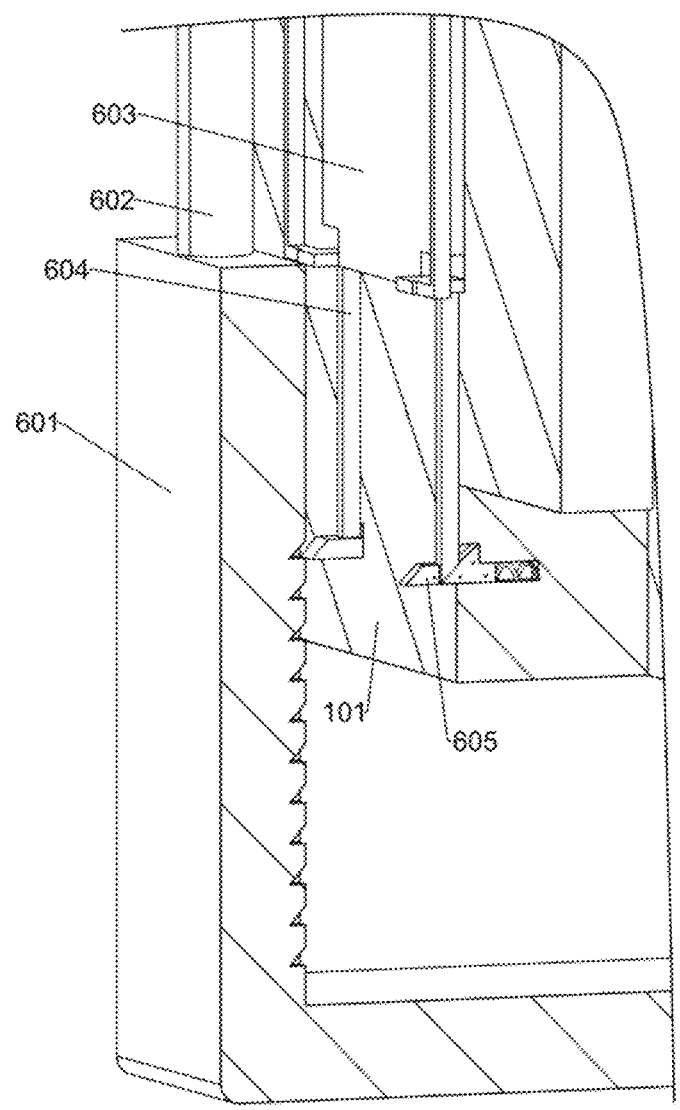
FIG. 16 is a schematic diagram of the three-dimensional structure of the locking plate, the irregular frame, the second spring block and other components of the present disclosure.

On the basis of the Embodiment 2, as shown in FIG. 1, FIG. 15 and FIG. 16, a buffer assembly is further included, which is set on the base 101. The buffer assembly is used to fix the symmetrically distributed bases 101. The buffer assembly includes four contact frames 601 with equal spacing and symmetrical distribution. The contact frames 601 are L-shaped plates, and the two contact frames 601 with equal spacing are both slidably connected to the outer side of the same base 101. The outer sides of the two bases 101 are fixedly connected to two retractable rods 602 with equal spacing. The telescopic ends of the retractable rods 602 are fixedly connected to the adjacent contact frames 601. The sliding frames 102 are fixedly connected to locking plates 603, which are in sliding fit with the adjacent bases 101. The bases 101 are slidably connected to two irregular frames 604 with equal spacing. The upper part of irregular frame 604 is a square plate, the middle part of irregular frame 604 is a square plate, and the lower part of irregular frame 604 is a wedge-shaped block. The square plate at the upper part of the irregular frame 604 is in limit fit with the upper of the adjacent contact frame 601, and the square plate at the middle part of the irregular frame 604 is in limit fit with the lower side of the adjacent locking plate 603. The base 101 is provided with symmetrically distributed second spring blocks 605, and the outer side of the second spring block 605 is an inclined surface. The middle of the second spring block 605 is provided with a squeezing groove, and the contact frame 601 is provided with an inclined groove. The outer sides of the second spring blocks 605 are in limit fit with the inclined groove of the contact frame 601, and the squeezing groove in the middle of the second spring block 605 is in limit fit with the lower side of the irregular frame 604.

Figure 17:
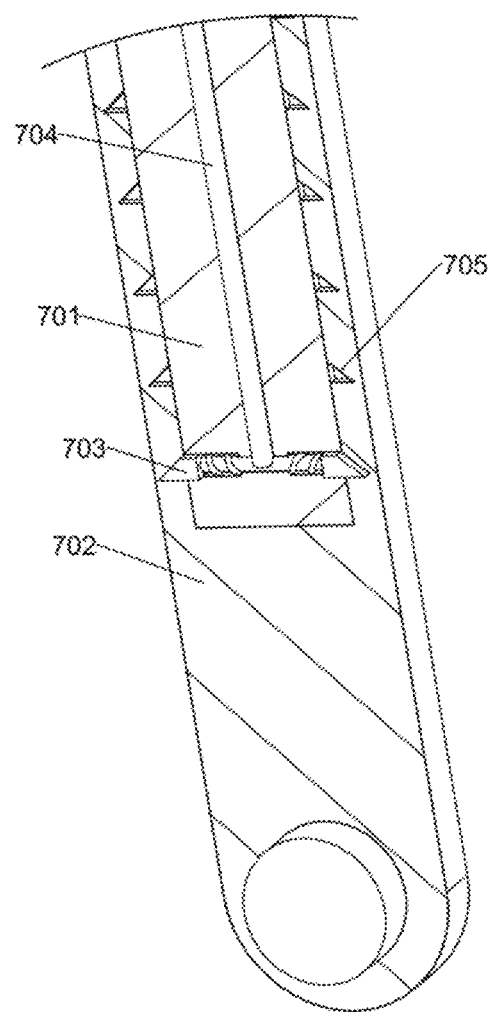
FIG. 17 is a schematic diagram of the three-dimensional structure of the limit fit between the lower support rod and the third spring block of the present disclosure.

As shown in FIG. 1, FIG. 17, and FIG. 18, it further includes a force dispersion assembly, which is used to disperse the downward pressure of the main support plate 105. The force dispersion assembly is set on the sliding frames 102, and includes four symmetrically distributed upper support rods 701. The four upper support rods 701 are respectively rotatably connected to the front and rear sides of the two symmetrically distributed sliding frames 102. The lower side of the upper support rod 701 is slidably connected to the lower support rod 702, and the lower side of the lower support rod 702 is rotatably matched with the adjacent base 101. The lower part of the upper support rod 701 is provided with a third spring block 703, and the third spring block 703 is composed of two symmetrically distributed wedge-shaped blocks and one spring. The lower support rod 702 is provided with the second limiting grooves 705 in equidistant distribution. The two wedge-shaped blocks of the third spring block 703 are in limit fit with the second limiting grooves 705 of the adjacent lower support rod 702. The third spring block 703 is fixedly connected to the fourth pulling rope 704, which is in a tension state. The fourth pulling rope 704 is fixedly connected to the adjacent sliding plate 304.

In the initial state of this device, the contact frames 601 are in contact with the lower sides of the bases 101. At this time, the contact frames 601 are in contact with the protrusions at the top of the irregular frames 604. At the same time, the irregular frames 604 are not in contact with the adjacent second spring blocks 605, and the second spring blocks 605 are inserted into the contact frames 601 due to its own spring effect and limit the contact frames 601. At this time, the retractable rods 602 are in a compressed state. When using this device, the operator activates four hydraulic rods 103, and the telescopic ends of the hydraulic rods 103 drive the sliding frames 102 and all parts on it to move upward. At the same time, the sliding frames 102 drive the adjacent two upper support rods 701 to move upward, and the upper support rods 701 drive the third spring block 703 to move upward. During the upward movement of the third spring block 703, the lower support rod 702 compresses the third spring blocks 703. When the top plate 117 contacts the roof of the mine, the operator closed four hydraulic rods 103, and at the same time, the third spring block 703 is inserted into the adjacent second limiting groove 705 of the lower support rod 702 due to its spring effect. By using the third block 703 to limit the position of the lower support rod 702, it can avoid the damage to the device caused by squeezing of the falling stones in the event of a mine collapse, which causes the device to lose its support for the mine. At the same time, the symmetrically distributed upper support rod 701 and lower support rod 702 will disperse the squeezing force of the falling stones to both sides, improving the stability of the device.

When the bottom of this device collapses, the telescopic ends of the retractable rods 602 push the contact frames 601 downward. During the downward movement of the contact frames 601, the contact frames 601 compress the adjacent second spring blocks 605, causing the second spring blocks 605 to move inward. Then, the second spring blocks 605 are reset under the action of the spring and inserted into the adjacent inclined grooves on the contact frames 601. By limiting the contact frames 601 through the second spring blocks 605, the contact frames 601 cannot be reset after moving downwards, avoiding the loss of support for the mine caused by the collapse of the mine bottom, thereby reducing the impact force on the mine caused by collapse.

After the use of this device, the operator activates four hydraulic rods 103. The telescopic ends of the hydraulic rods 103 drive the sliding frames 102 to move downwards, and the sliding frames 102 drive the locking plates 603 to move downwards. When the locking plates 603 come into contact with the protrusions in the middle of the irregular frames 604, during the downward movement of the locking plates 603, the locking plates 603 compress the protrusions in the middle of the irregular frames 604, then the locking plates 603 drive the irregular frames 604 to move downwards. The irregular frames 604 compress the squeezing groove in the middle of the second spring blocks 605, and the second spring blocks 605 move inward. After the second spring blocks 605 move to the inside of the bases 101, the second spring blocks 605 lose contact with the adjacent contact frames 601 and lose the limitation to the contact frames 601.

After the second spring blocks 605 lose its limit to the contact frames 601, the bases 101 and all parts on the bases 101 move downward synchronously until the bottoms of the bases 101 contact the contact frames 601. After that, the bases 101 and all parts on the bases 101 no longer move downward. Then, the operator closes the four hydraulic rods 103 and ends the use of this device. When the use of the present device is completed, the operator turns on the servo motor 302, then the sliding plates 304 pull the adjacent fourth pull rope 704 during the movement of the sliding plates 304 toward the middle, causing the third spring block 703 to move towards the middle and lose contact with the lower support rods 702, thereby losing the limit to the lower support rods 702. Subsequently, during the downward movement of the sliding frames 102, the sliding frames 102 compress the upper support rods 701 to make the upper support rods 701 restored to its original positions. After that, the operator turns off the servo motor 302 and ends the use of the device.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. An automatic support device for resisting rock burst in mines, comprising bases symmetrically distributed, sliding frames are slidably connected to the bases, hydraulic rods are fixedly connected to the bases, telescopic ends of the hydraulic rods are fixedly connected to the adjacent sliding frames, brackets are fixedly connected to the sliding frames, the brackets symmetrically distributed are provided with a main support plate, the main support plate is provided with first pushing rods evenly spaced and symmetrically distributed and third pushing rods evenly spaced and symmetrically distributed, the main support plate is fixedly connected to second pushing rods symmetrically distributed and fourth pushing rods symmetrically distributed, the first pushing rods with evenly spaced are communicated with a first oil pipe communicated with the adjacent second pushing rods, the third pushing rods with evenly spaced are communicated with a second oil pipe communicated with the adjacent fourth pushing rods, and telescopic ends of the first pushing rods symmetrically distributed and telescopic ends of the third pushing rods symmetrically distributed are both fixedly connected to upper retaining plates; the main support plate is provided with a pressure regulating assembly for adjusting the positions of the first pushing rods and the third pushing rods, the upper retaining plates with equidistant distribution are fixedly connected to a top plate, the second pushing rods and the fourth pushing rods are respectively slidably connected to piston plates, springs are fixedly connected between the second pushing rods and adjacent piston plates, and between the fourth pushing rods and adjacent piston plates; and the first pushing rods, the second pushing rods, the third pushing rods, and the fourth pushing rods all contain hydraulic fluid;

the main support plate is provided with side support plates symmetrically distributed, and the side support plates are fixedly connected with fifth pushing rods symmetrically distributed, telescopic end of the fifth pushing rods symmetrically distributed are jointly fixedly connected to the side support plates, and the fifth pushing rods contain hydraulic fluid;

the pressure regulating assembly comprises sixth pushing rods with equal spacing and symmetrical distribution, wherein the sixth pushing rods are fixedly connected to the main support plate, the first pushing rods are fixedly connected to telescopic ends of the adjacent sixth pushing rods, the third pushing rods are fixedly connected to the telescopic ends of the adjacent sixth pushing rods, the sixth pushing rods are provided with first chambers and second chambers, the first chambers with equidistant distribution are communicated with a third oil pipe, the third oil pipe is communicated with the adjacent fourth pushing rods, the second chambers with equidistant distribution are communicated with a fourth oil pipe, the fourth oil pipe is communicated with the adjacent second pushing rods, and both the first pushing rods and the third pushing rods are in a sliding fit with the main support plate.

2. The automatic support device for resisting rock burst in mines according to claim 1, further comprising a sliding mechanism, wherein the sliding mechanism is set on the main support plate and used to separate the sliding frames in symmetrical distribution towards to both sides; the sliding mechanism comprises a fixed seat, wherein the fixed seat is fixedly connected to the main support plate, the fixed seat is installed with a servo motor, and an output shaft of the servo motor is fixedly connected with a spur gear, the fixed seat is slidably connected with sliding plates in symmetrical distribution, each of the sliding plates in symmetrical distribution is provided with a rack that mesh with the spur gear, the sliding plates in symmetrical distribution are respectively matched with adjacent sliding frames; springs are fixedly connected between the sliding plates in symmetrical distribution and the adjacent sliding frames, each of the brackets symmetrically distributed is slidably connected to an upper friction plate; a first pulling rope is fixedly connected between the upper friction plate and the adjacent sliding plates, the upper friction plate and adjacent brackets are fixedly connected to tension springs, the brackets symmetrically distributed are slidably connected to sliding seats, the sliding seats are in sliding fit with the main support plate, the sliding seats are fixedly connected to adjacent side support plates, the sliding seats are provided with a first locking assembly for fixing the brackets, and the sliding seats are provided with a second locking assembly for fixing itself.

3. The automatic support device for resisting rock burst in mines according to claim 2, wherein the first locking assembly comprises ratchet bars in symmetrically distribution, the ratchet bars in symmetrically distribution are respectively fixedly connected to adjacent sliding seats, the brackets symmetrically distributed are respectively rotatably connected to pawls, the pawls match with the corresponding ratchet bars, torsion springs are fixedly connected between the pawls and the adjacent brackets, a second pulling rope is fixedly connected to the pawls, and the second pulling rope is fixedly connected to the adjacent sliding plates.

4. The automatic support device for resisting rock burst in mines according to claim 3, wherein the second locking assembly comprises first spring blocks in symmetrically distribution, the first spring blocks in symmetrically distribution are respectively set on the adjacent sliding seats, a third pulling rope is fixedly connected between the first spring blocks and the adjacent lower friction plates, the main support plate is provided with first limiting grooves distributed at equal intervals, and the first spring blocks match with the first limiting grooves of the adjacent main support plate.

5. The automatic support device for resisting rock burst in mines according to claim 4, further comprising a force dispersion assembly, wherein the force dispersion assembly is used to disperse downward pressure of the main support plate, and the force dispersion assembly is set on the sliding frames; the force dispersion assembly comprises upper support rods in symmetrically distribution, the upper support rods in symmetrically distribution are respectively rotatably connected to the sliding frames, the upper support rods are slidably connected to the lower support rods, and the lower support rods are rotationally matched with the adjacent bases; the upper support rods are provided with third spring blocks, the lower support rods are provided with second limiting grooves with evenly spacing, the third spring blocks is in limit fit with the second limiting grooves of the adjacent lower support rods, the third spring blocks are fixedly connected to a fourth pulling rope, and the fourth pulling rope is fixedly connected to the adjacent sliding plates.

6. The automatic support device for resisting rock burst in mines according to claim 5, wherein the first pulling rope, the second pulling rope, the third pulling rope, and the fourth pulling rope are in tension state.

7. The automatic support device for resisting rock burst in mines according to claim 2, wherein the side support plates in symmetrically distribution are respectively slidably connected to lower friction plates, the lower friction plates match with the adjacent upper friction plates, the bracket match with the adjacent side support plates, the frictional force between the upper friction plates and the lower friction plates is greater than the frictional force between the sliding seats and the adjacent brackets.

8. The automatic support device for resisting rock burst in mines according to claim 1, further comprising a buffer assembly, wherein the buffer assembly is set on the bases symmetrically distributed and used to fix the bases symmetrically distributed; the buffer assembly comprises contact frames with equal spacing and symmetrical distribution, and the contact frames with equal spacing are respectively slidably connected to adjacent bases, the bases are fixedly connected to retractable rods with equal spacing distribution, telescopic ends of the retractable rods are fixedly connected to adjacent contact frames, the bases are slidably connected to locking plates fixedly connected to the adjacent sliding frames, the bases are slidably connected to irregular frames with equal spacing distribution, the irregular frames are in limit fit with adjacent contact frames, the irregular frames are in limit fit with adjacent locking plates, the bases are provided with second spring blocks symmetrically distributed, the second spring blocks are in limit fit with the contact frames, and the second spring blocks are in limit fit with the irregular frames.

\* \* \* \* \*